No. 859,393. PATENTED JULY 9, 1907.
R. E. LINCOLN.
VARIABLE SPEED TRANSMISSION MECHANISM.
APPLICATION FILED JULY 18, 1906.
2 SHEETS—SHEET 2.
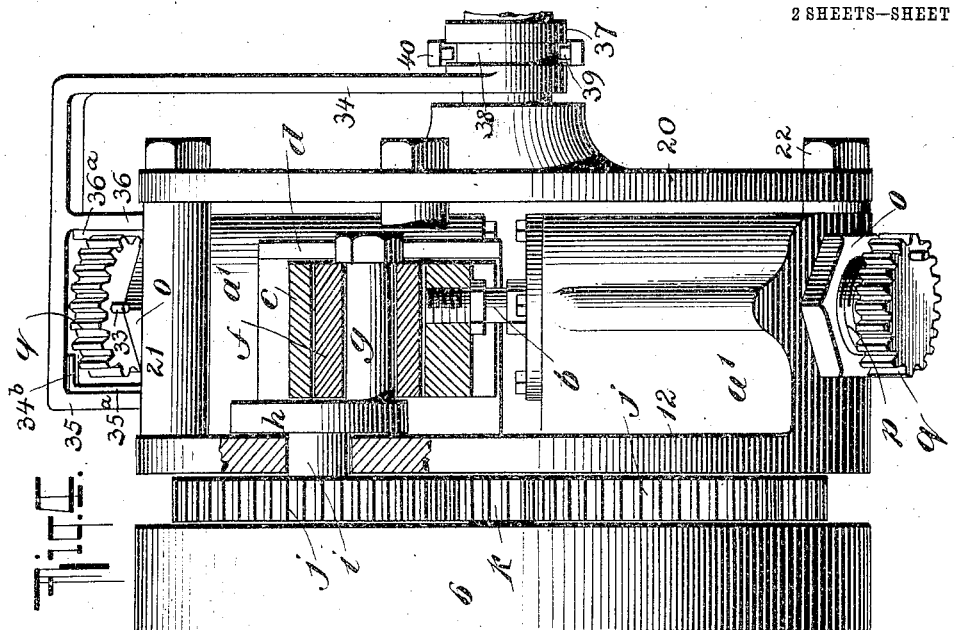
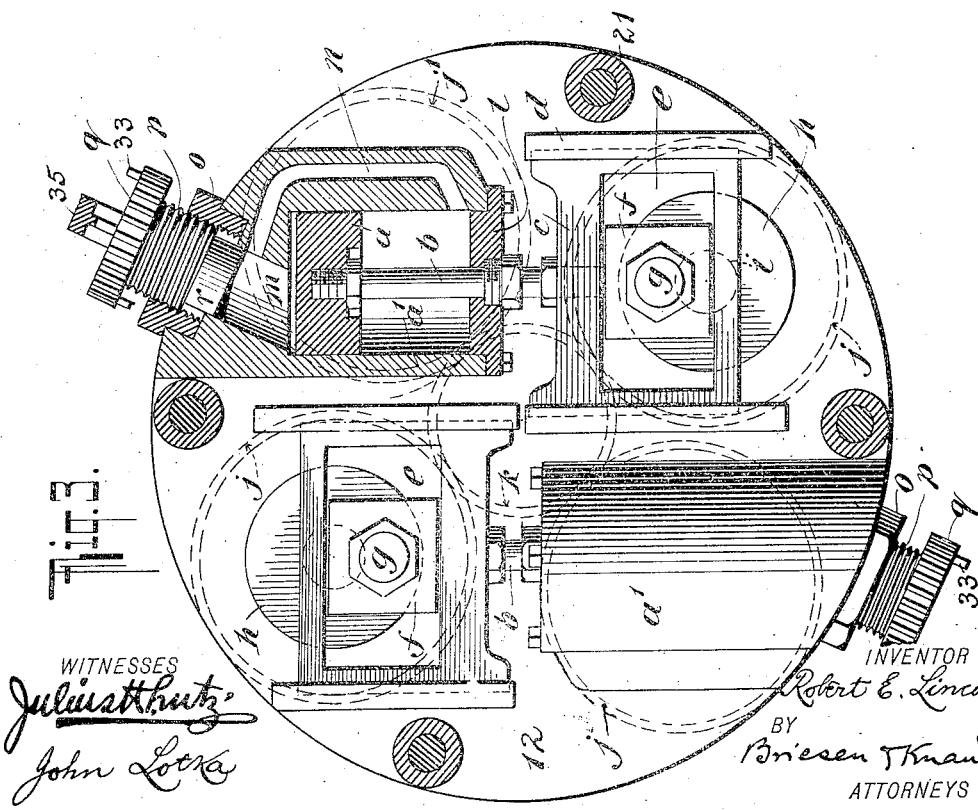
WITNESSES
INVENTOR
Robert E. Lincoln
BY
Briesen & Knauth
ATTORNEYS

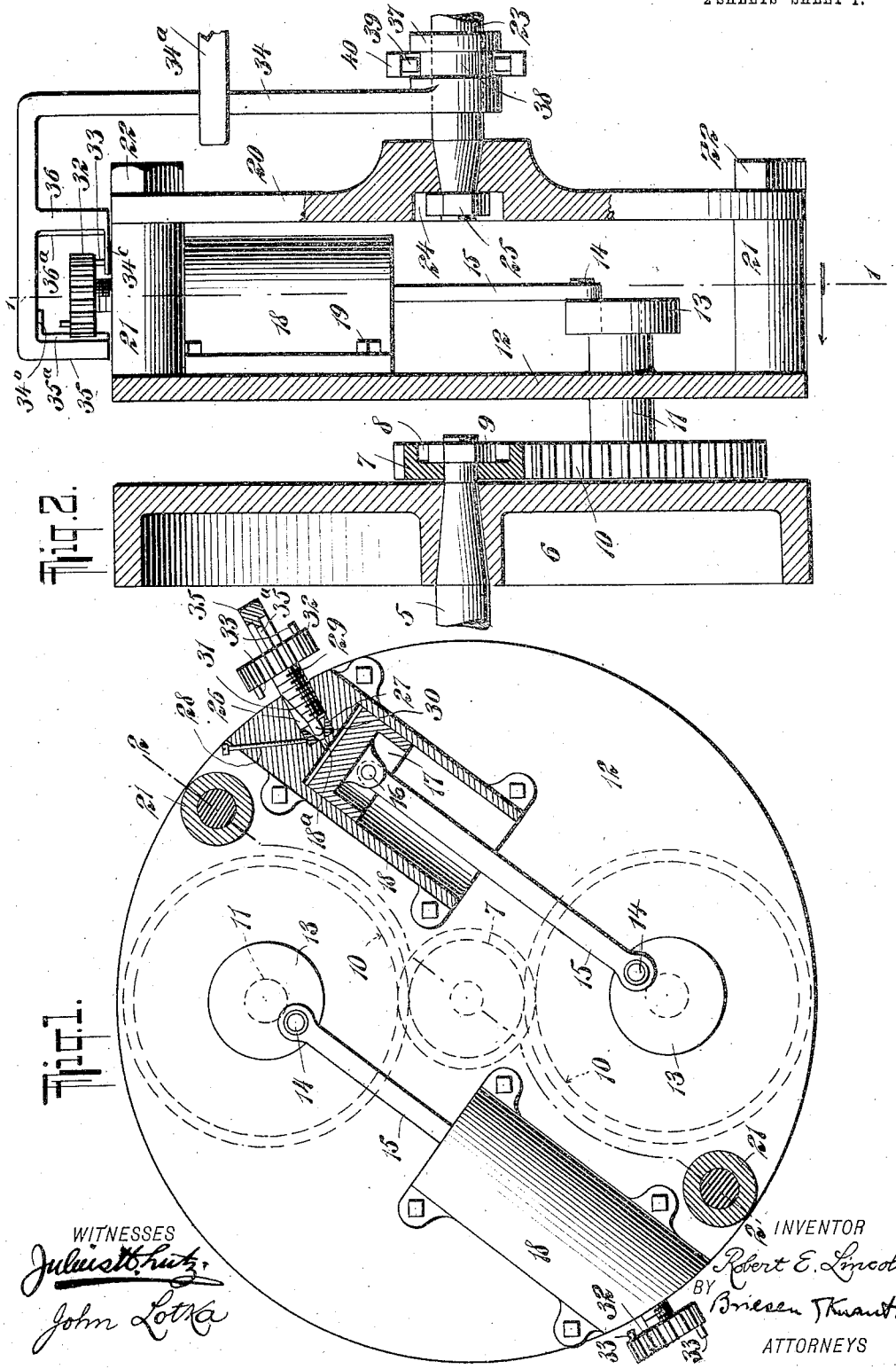

UNITED STATES PATENT OFFICE.

ROBERT E. LINCOLN, OF JERSEY CITY, NEW JERSEY.

VARIABLE-SPEED TRANSMISSION MECHANISM.

No. 859,393.

Specification of Letters Patent.

Patented July 9, 1907.

Application filed July 18, 1906. Serial No. 326,663.

*To all whom it may concern:*

Be it known that I, ROBERT E. LINCOLN, a citizen of the United States, and a resident of Jersey City, Hudson county, State of New Jersey, have invented certain new and useful Improvements in Variable-Speed Transmission Mechanism, of which the following is a specification.

My invention relates to mechanism for transmitting power at variable speeds and has for its object to improve and simplify mechanisms of this character.

My invention will be fully described hereinafter and the features of novelty will be pointed out in the appended claims.

Reference is to be had to the accompanying drawings in which

Figure 1 is a face view of my improved device, with parts in section on line 1—1 of Fig. 2; Fig. 2 is a section thereof on line 2—2 of Fig. 1; Fig. 3 is a face view, partly in section, of another form of my invention; and Fig. 4 is a side elevation thereof, partly in section.

5 represents the driving shaft to which is secured rigidly the fly wheel 6 and the pinion 7. This pinion 7 is provided with a recessed portion 8 into which the nut 9 is adapted to be received, so that said nut does not project beyond the outer surface of the gear, when in position on the shaft 5.

10 are gears which mesh with the pinion 7 and which are mounted to rotate in suitable bearings 11, which bearings form part of or are secured to a plate 12. Located on the same shafts which carry the gears 10 are disks 13 to each of which is pivotally fastened at 14 a connecting rod 15, the other end of which is pivoted at 16 to a piston 17. The pistons 17 are adapted to travel back and forth in cylinders 18, which cylinders are secured to the plate 12, by means of bolts or other fastening devices 19. The plate 12 is carried by another plate 20, to which it is secured by means of posts 21 and nuts 22. The plate 20 is rigidly mounted on the driven shaft 23 and is provided with a recess 24, for the securing nut 25.

Each cylinder 18 is closed at one end and is provided with a screw-threaded recess 26 in which is located a (rubber) seat 27 secured in position by a screw 28, which recess is connected by a passage 18$^a$ within the interior of the cylinder 18. A valve comprising a screw threaded stem 29, having a pin 30, and provided with an inclined flat portion 31 is arranged to enter the recess 26. At its free end the stem 29 is provided with a toothed wheel 32 which has pins 33 on its opposite sides, the purpose of which will be described hereinafter.

A speed-regulating member 34 having projections 35, 36 provided with knife edges 35$^a$, 36$^a$ is mounted loosely on the shaft 23 in such a manner as to be capable of sliding along said shaft. The said member 34 is held against turning with the shaft 23 in any suitable manner as by a fork 34$^a$ and is provided with a collar 37 having a groove 38 into which project pins 39 which are secured to or form part of a fork 40. This fork is connected with any suitable mechanism for shifting the collar 37 and with it the member 34 along the shaft 23 in one direction or the other as will be more fully explained hereinafter.

In Fig. 1 the stems 29 are shown screwed all the way into the recesses 26 so that the inclined portions 31 are entirely within said recesses 26 and the pins 30 engage the seats 27 and thus close the passages 18$^a$. In this condition no air can be forced out of the cylinders so that the air in said cylinders will form a cushion and prevent the pistons 17 from being moved in the cylinders. The gears 10 therefore cannot rotate relatively to the plate 12, and are locked to the pinion 7; if power is now applied to rotate the shaft 5, the pinion 7 and the gear 10 together with the piston, cylinders and connecting mechanism will act as a clutch and the two shafts 5 and 23 will be driven at the same speed, it being understood that the plates 12 and 20 and the parts secured thereto all rotate with the shafts. If the parts however are in the other extreme position, that is with the stems 29 screwed out of the recesses 26, the air in the cylinders can be easily forced out or sucked in so that practically no resistance is offered to the action of the pistons 17. When this condition exists the rotation of the shaft 5 will cause the gears 10 to rotate *in situ* on their shafts, that is, the bearings 11, plates 12 and 20, and shaft 23 will remain stationary, the pistons working back and forth without exerting any function, the resistance of the mechanism connected with the driven shaft being sufficient to hold it stationary in this case. Any intermediate speed may be obtained by proper adjustment of the valves controlling the passages 18$^a$. As long as the passages are partly open so as to allow some air to escape and enter, the plates 12 and 20 will be rotated together with the shaft 23, and the more the valves approach the closed position, the greater the speed of said shaft will become. Whenever said plates and the shaft 23 rotate at a speed lower than that of the driving shaft 5, the shafts of the wheels 10 not only rotate in their bearings 11, but at the same time said wheels 10 roll or travel on the pinion 7, since the bearings 11 themselves rotate with the shaft 23 in the same direction as the shaft 5, but at a lower rate of speed.

The speed-regulating member 34 is normally in a central, inactive position, in which its knife edges 35$^a$, 36$^a$ will not engage the toothed wheels 32. If it is desired to increase the speed of the driven shaft the collar 37 and the member 34, are moved to the left in Fig. 2 through the medium of the fork 40. This brings the knife edge 36$^a$ into the path of the toothed wheels 32 so that as the mechanism is rotated the said wheels 32 will be engaged at each revolution by the knife edge 36ª and partially rotated so as to screw the stems 29 into the recesses 26 and thus reduce the size of the vent which communicates with the cylinder. The air in the cylinders thus begins to offer more and more resistance to the action of the pistons and the parts are brought nearer to the condition in which they are locked together as described above, thus gradually increasing the speed of the driven shaft. As soon as the required speed is attained the collar 37 and member 34 are moved to a position when both the knife edges 35ª and 36ª will be out of the path of the wheels 32. If it is desired to reduce the speed the collar 37 and member 34 are moved to the right in Fig. 2 so that the knife edge 35ª will engage the wheels 32 to gradually screw the stems 29 out of the recesses 26 and thus increase the size of the air vent so that the air in the cylinders will gradually offer less resistance to the action of the pistons as described hereinbefore. This will reduce the speed. It is not absolutely necessary that the valves should be capable of being brought to a position where the driven shaft will remain stationary, but in many cases it will be sufficient to have the speed reduced to a certain low limit when the valves are in their outermost position.

In order to prevent the smashing of the mechanism when the valve or stem 29 has reached its innermost or outermost position the member 34 is provided with inclined projections 34ᵇ and 34ᶜ. Thus as the stem is moved outward and has reached its outermost position one of the pins 33 will engage the projection 34ᵇ which being inclined will have a cam action and will thus cause the member 34 to be moved to its inactive position. The same action takes place when the innermost position of the stem is reached in which case the other pin 33 engages the projection 34ᶜ and forces the member 34 to a position in which the knife edges are inactive.

In the form of my invention shown in Figs. 3 and 4, the pistons a in the cylinders a' are connected by means of rods b with frames c which are mounted to travel back and forth in guides d. These frames c are provided with transverse openings e in which blocks f are arranged to travel transversely to the path of the frames c and pistons a. These blocks f are mounted on pins g secured to or forming part of disks h. These disks h are mounted on shafts i which also carry gears j; these disks h and gears j correspond to the gears 10 and disks 13 shown in Figs. 1 and 2. The gears j mesh with a pinion k which corresponds to the pinion 7 described with regard to Figs. 1 and 2. In the present instance the cylinders a' are closed at one end by the plates l having central apertures for the accommodation of the rods b. The other ends of the cylinders communicate with the chambers m and are provided with screw-threaded bushings o which are adapted to receive the plugs p having the toothed wheels q which correspond to the toothed wheels 32. The plugs p are further provided with extensions r which are of the same diameter as the chambers m and which are adapted to close more or less one end of the passage n the purpose of which will be more clearly described hereinafter. Two extra gears j' are provided which also mesh with the pinion k but are not connected with any other mechanism and are merely for the purpose of equalizing strains and to prevent wabbling.

If desired these last two gears may be omitted. The other parts are practically the same as in Figs. 1 and 2 and have been designated accordingly.

In operation, if the parts are in the position shown in Fig. 3, the rotation of the shaft 5 and the pinion k will rotate the gear wheels j and j' on their axes or shafts, but at the same time the plate 12 and the parts connected therewith will be rotated slowly in the same direction as the shaft 5. This causes the shaft 23 to be driven at a slow speed in the same manner as described with regard to the construction shown in Figs. 1 and 2. As the disks h are rotated through their connection with the gears j, the blocks f are carried along and travel transversely of the frames c and at the same time cause said frames to move up and down and thus reciprocate the pistons a in the cylinders a'. This reciprocation of the pistons a causes the air in the cylinders to be alternately driven from one side of said pistons to the other through the passages n. Both ends of the passages n being completely open as shown in Fig. 3, the air will be easily displaced by the reciprocation of the pistons and will offer very little resistance to said pistons causing the mechanism to operate as just described. If, however, the plugs p are screwed in through the medium of mechanism similar to the parts designated 34, 35ª, 36ª, 37, 38, 39 and 40 in Figs. 1 and 2, the projections or extensions r will project beyond the one end of the passages n and close said end more or less according to the distance the plugs are screwed inward. As the size of the opening of the end of the passages n is reduced it becomes more difficult to displace the air in the cylinders from one side of the pistons to the other so that the pistons encounter a resistance, and the gears j thus rotate less and less until when one end of the passage is entirely closed the air forms a cushion in the cylinders and prevents the pistons from being moved, thus practically locking the shafts 5 and 23 together just as described with regard to Figs. 1 and 2.

While I have described the operation of my apparatus with air to fill the cylinders, I desire it to be understood that other fluids, such as water or oil, might be used.

I claim:

1. The combination of the driving gear wheel, with a driven member mounted to rotate about an axis alining with that of said wheel, a driven gear mounted to rotate on said driven member about an axis eccentric to the first-mentioned axis, said gears meshing with one another, a cylinder mounted on said driven member, a piston movable in said cylinder, means for reciprocating the piston by the rotation of said driven gear relatively to the driven member, means carried by the driven member for varying the resistance to the reciprocation of the piston, and a speed-regulating device, relatively stationary and adapted to be thrown into the path of the said resistance-varying means to operate the same.

2. The combination of the driving gear wheel, with a driven member mounted to rotate about an axis alining with that of said wheel, a driven gear mounted to rotate on said driven member about an axis eccentric to the first mentioned axis, said gears meshing with one another, a cylinder mounted on said driven member, a piston movable in said cylinder, means for reciprocating the piston by the rotation of said driven gear relatively to the driven member, means, carried by the driven member, for varying the resistance to the reciprocation of the piston, and a speed-regulating device, relatively stationary, and movable in opposite directions from a normal position to be thrown with opposite effect into the path of said resistance-varying means, to increase or reduce the speed of the driven member.

3. The combination of the driving gear wheel, with a driven member mounted to rotate about an axis alining with that of said wheel, a driven gear mounted to rotate on said driven member about an axis eccentric to the first mentioned axis, said gears meshing with one another, a cylinder mounted on said driven member, a piston movable in said cylinder, means for reciprocating the piston by the rotation of said driven gear relatively to the driven member, means, carried by the driven member, for varying the resistance to the reciprocation of the piston, a speed-regulating device, relatively stationary, and movable in opposite directions from a normal position to be thrown with opposite effect into the path of said resistance-varying means, to increase or reduce the speed of the driven member, and means for automatically throwing the speed-regulating device into its normal inactive position when said resistance-varying means reaches one or the other of its extreme positions.

4. The combination of the driving gear wheel, with a driven member mounted to rotate about an axis alining with that of said wheel, a driven gear mounted to rotate on said driven member about an axis eccentric to the first mentioned axis, said gears meshing with one another, a cylinder mounted on said driven member, a piston movable in said cylinder, means for reciprocating the piston by the rotation of said driven gear relatively to the driven member, means, carried by the driven member, for varying the resistance to the reciprocation of the piston, a speed-regulating device, relatively stationary and adapted to be thrown into the path of said resistance-varying means to operate the same, and means for automatically throwing the speed-regulating device into its normal inactive position when said resistance-varying means reaches its extreme position.

5. The combination of the driving gear wheel, with a driven member mounted to rotate about an axis alining with that of said wheel, a driven gear mounted to rotate on said driven member about an axis eccentric to the first mentioned axis, said gears meshing with one another, a cylinder mounted on said driven member, a piston movable in said cylinder, means for reciprocating the piston by the rotation of said driven gear relatively to the driven member, a rotatable valve controlling a passage connected with the cylinder, to vary the speed by governing the resistance to the reciprocation of the piston, and a relatively stationary speed-regulating device arranged to be projected into the path of an operating member on the valve, so that the latter will be partially rotated every time its operating member engages the speed-regulating device.

6. The combination of the driving gear wheel, with a driven member mounted to rotate about an axis alining with that of said wheel, a driven gear mounted to rotate on said driven member about an axis eccentric to the first mentioned axis, said gears meshing with one another, a cylinder mounted on said driven member, a piston movable in said cylinder, means for reciprocating the piston by the rotation of said driven gear relatively to the driven member, a rotatable valve controlling a passage connected with the cylinder, to vary the speed by governing the resistance to the reciprocation of the piston, an operating member connected with the valve to rotate therewith, and a relatively stationary speed-regulating device arranged to be projected into the path of the said operating member on one side or the other, to rotate the valve in one direction or the other and thus increase or reduce the speed of the driven member.

7. The combination of the driving gear wheel, with a driven member mounted to rotate about an axis alining with that of said wheel, a driven gear mounted to rotate on said driven member about an axis eccentric to the first mentioned axis, said gears meshing with one another, a cylinder mounted on said driven member, a piston movable in said cylinder, means for reciprocating the piston by the rotation of said driven gear relatively to the driven member, a rotatable valve controlling a passage connected with the cylinder, to vary the speed by governing the resistance to the reciprocation of the piston, an operating member connected with the valve to rotate therewith, a relatively stationary speed-regulating device arranged to be projected into the path of said operating member to rotate the valve partially every time its operating member engages the speed-regulating device, and means for automatically throwing the speed-regulating device into its normal inactive position when the valve reaches its extreme position.

8. The combination of the driving gear wheel, with a driven member mounted to rotate about an axis alining with that of said wheel, a driven gear mounted to rotate on said driven member about an axis eccentric to the first mentioned axis, said gears meshing with one another, a cylinder mounted on said driven member, a piston movable in said cylinder, means for reciprocating the piston by the rotation of said driven gear relatively to the driven member, a rotatable valve controlling a passage connected with the cylinder, to vary the speed by governing the resistance to the reciprocation of the piston, an operating member connected with the valve to rotate therewith, a relatively stationary speed-regulating device arranged to be projected into the path of said operating member on one side or the other, to rotate the valve in one direction or the other and thus increase or reduce the speed of the driven member, and means for automatically throwing the speed-regulating device into its normal inactive position when the valve reaches one or the other of its extreme positions.

In testimony whereof I have signed my name to this specification in the presence of two subscribing witnesses.

ROBERT E. LINCOLN.

Witnesses:
 JOHN LOTKA,
 JOHN A. KEHLENBECK.